Aug. 10, 1965 H. G. FARMLETT 3,199,768

PROTECTIVE COVER FOR PHONOGRAPH DISCS

Filed Nov. 12, 1963

INVENTOR.
HARRY G. FARMLETT
BY Michael [signature]
ATTORNEY 3,199,768

PROTECTIVE COVER FOR PHONOGRAPH DISCS

Harry G. Farmlett, 41—67 Judge St., Elmhurst 73, Long Island, N.Y.

Filed Nov. 12, 1963, Ser. No. 322,919
1 Claim. (Cl. 229—68)

This invention relates generally to protective covers for phonograph records, and in particular to an improved cover combination constituted by an inner sleeve insertable within an outer jacket.

Phonograph discs are designed to rotate at 78, 45 and 33⅓ r.p.m., and in some instances at 16⅔ r.p.m. These records vary in size from seven inches in diameter for the 16⅔ and 45 r.p.m. records, to sixteen inches for professional transcriptions. Since reproduction is effected by means of a stylus which rides in a grooved track on the record, the presence of dust or other foreign matter gives rise to noise and distortion. Because of the plastic nature of the record material, dust tends to adhere thereon electrostatically and hence is difficult to remove. It is therefore important in storing records to provide effective protection against the accumulation of dust.

It is also important that the record be protected against mechanical abrasion, for the record material is relatively soft and easily scratched or otherwise damaged. Furthermore, the record protector must be relatively stiff in order to maintain the flatness of the disc and prevent warpage.

It is for the above-noted reasons that covers have been developed in the form of a light, paper sleeve or envelope to accommodate the record, the sleeve being received within a relatively stiff jacket. The jacket serves not only as a protective cover capable of withstanding repeated handling, but also to carry promotional and descriptive material, as well as identifying indicia.

While phonograph discs are round, both the sleeve therefor and the jacket are usually square or rectangular in shape, the jacket being slightly larger than the sleeve to permit insertion. But since the sleeve is of soft paper, unless it is carefully introduced into the jacket, the corners thereof will be bent, crushed or otherwise frayed. With repeated insertions, the sleeve becomes almost unusable and is frequently discarded. Consequently, the record lies in an open-ended jacket and is inadequately protected.

Accordingly, it is the main object of this invention to provide an improved record and sleeve combination for phonograph records, whereby the sleeve may be repeatedly inserted without difficulty into the jacket, and in which crushing or other mutilation of the sleeve corners is avoided.

More specifically, it is an object of the invention to provide in a combination of the above-noted type, a sleeve having two adjacent corners so chamfered as to define a tongue facilitating insertion into the jacket, the sleeve being so formed as to define an envelope enclosure having a sealed edge which is aligned with the jacket opening, thereby protecting the disc against dust.

Also an object of the invention is to provide an effective jacket and sleeve combination which may be manufactured and sold at low cost.

For a better understanding of the invention as well as other objects and further features thereof, reference is had to the following detailed description to be read in conjunction with the accompanying drawing, wherein.

Figures 1, 2:
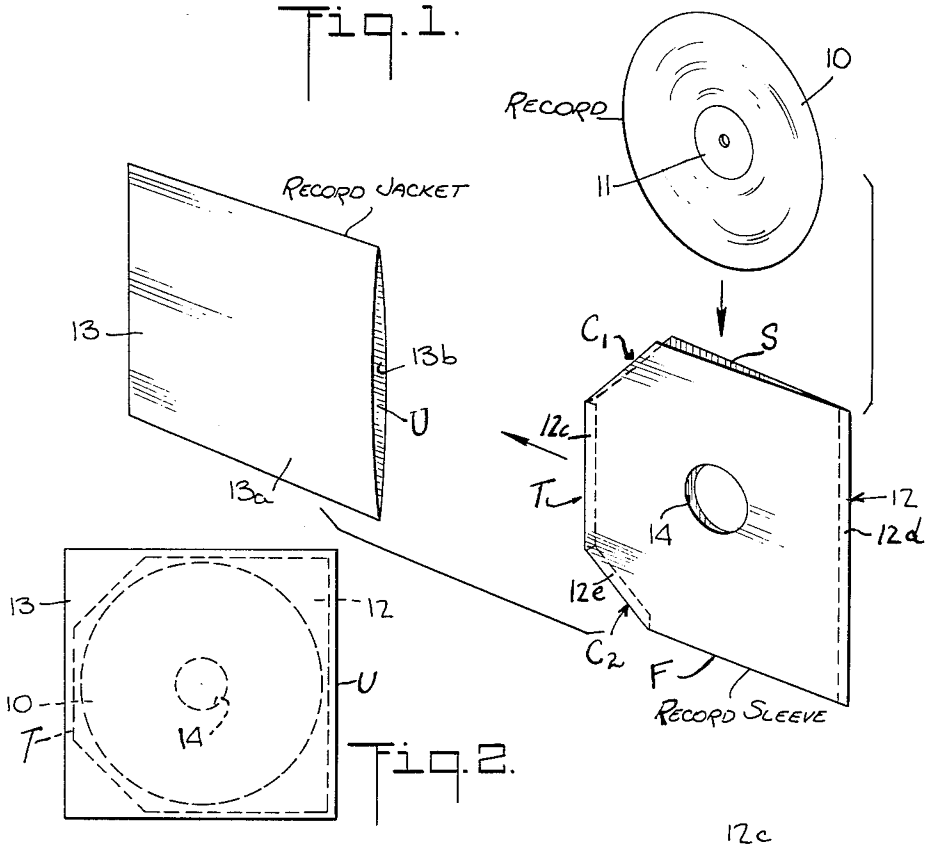
FIG. 1 shows in perspective a jacket and sleeve combination in accordance with the invention, for protecting a phonograph disc, and also the manner of introducing the disc into the sleeve and the sleeve into the jacket.
FIG. 2 is a plan view of the assembled record and cover therefor.

Referring now to FIG. 1, disc 10 is a typical phonograph record made of suitable synthetic plastic material and having the usual spiral track and spindle hole, with a label 11 surrounding the hole. It is to be understood that the dimensions of the sleeve-and-jacket disc protector disclosed herein will depend on the diameter of the associated disc.

The protective cover for the disc is constituted by a sleeve 12 acting as an envelope for the record disc, the sleeve being insertable in a jacket 13. Sleeve 12 is formed of light-weight paper or similar material, and may be provided with a central port 14 to expose the label area of the disc. A transparent window of plastic sheeting may be placed over the port in more expensive versions of the sleeve.

Figure 3:
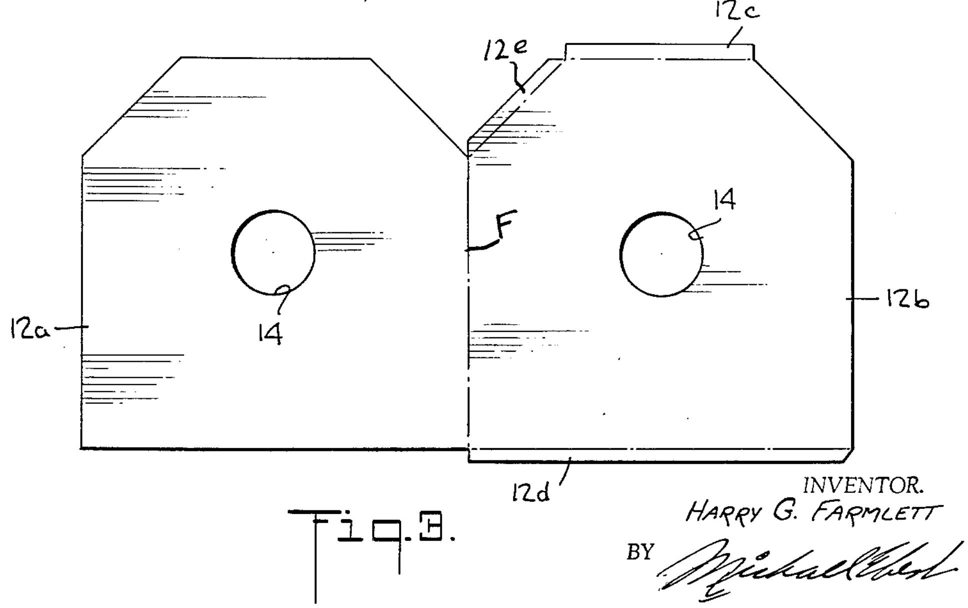
FIG. 3 illustrates the paper blank from which the sleeve is made.

Sleeve 12 is generally rectangular in form, and as shown separately in FIG. 3, is made from a single die-cut blank of paper having a transverse fold line dividing the blank into panels 12*a* and 12*b*. Panel 12*b* includes upper and lower marginal flaps 12*c* and 12*d*, respectively, and a small inclined corner flap 12*e*.

In converting the blank into a sleeve in accordance with the invention, panel 12*a* is folded over panel 12*b*, the fold line F then constituting the sealed side of the sleeve. Flaps 12*c*, 12*d* and 12*e* are folded over panel 12*a* and adhesively bonded thereto to close off the opposing ends of the sleeve, whereby the only opening in the sleeve is through the side S. While the flaps may be folded over panel 12*a*, alternatively, they may be folded over panel 12*b* and coated with adhesive before panel 12*a* is folded over panel 12*b*, whereby the flaps in the completed sleeve lie on the inside.

The corners $C_1$ and $C_2$ at the end formed by flap 12*c* are chamfered to define a tongue T. Thus, as shown in FIG. 1, the record 10 is slipped into the sleeve through the open side S. The jacket 13 is of rectangular shape, and is formed of two like superposed panels 13*a* and 13*b* of rectangular form, which are marginally sealed together except on one side, thereby providing an opening U. The sleeve with the record therein is introduced into the jacket with the tongue T extending forwardly, as shown in FIG. 1, whereby it is not necessary to carefully position the sleeve with respect to the jacket, in that the tongue facilitates entry and serves to locate the sleeve properly therein.

As shown in FIG. 2, when the combination is fully assembled, the sealed side 12*d* of the sleeve is aligned with the opening U of the jacket; hence the record is fully enclosed within the jacket and sleeve combination and is shielded from ambient dust and foreign matter.

While there has been shown a preferred embodiment of a protective cover for phonograph discs in accordance with the invention, it will be appreciated that many changes and modifications may be made therein without, however, departing from the essential spirit of the invention as defined in the annexed claim.

What is claimed is:

A protective cover for a single phonograph disc comprising a generally rectangular paper sleeve telescopically receivable within a rectangular jacket of relatively stiff cardboard having only one open side, said sleeve enclosing said disc and having two adjacent corners which are chamfered to define a tongue facilitating telescopic insertion of said sleeve in said jacket, both the first side of said sleeve which includes said two adjacent corners and the second side opposed thereto being sealed, the third side which includes one of two said corners being also sealed, and the fourth side which includes the other of said two corners being unsealed to provide an opening for said disc, whereby when said sleeve is inserted in said jacket the second and sealed side of said sleeve is aligned with the jacket opening, whereby the unsealed fourth side and the other of said two corners are enclosed in said jacket and the disc is fully protected against dust.

References Cited by the Examiner

UNITED STATES PATENTS

| | | | |
|---|---|---|---|
| 2,384,633 | 9/45 | Markowski | 206—62 |
| 2,574,050 | 11/51 | McCart | 206—62 |
| 3,005,544 | 10/61 | Chaplin | 206—62 |
| 3,102,635 | 9/63 | Werwin et al. | 229—62 |
| 3,112,858 | 12/63 | Ullger | 229—68 |

FOREIGN PATENTS

| | | |
|---|---|---|
| 1,215,093 | 4/60 | France. |

JOSEPH R. LECLAIR, *Primary Examiner.*

FRANKLIN T. GARRETT, *Examiner.*